United States Patent

Cho et al.

[11] Patent Number: 6,054,934
[45] Date of Patent: Apr. 25, 2000

[54] CALL RECEPTION CONTROL METHOD IN WIDE AREA RADIO PAGER CAPABLE

[75] Inventors: Kyu Hun Cho, Seoul; Jae Hwa Kwon; Jung Wook Hwang, both of Kyunggi-Do; Gun Eui Hong, Seoul, all of Rep. of Korea

[73] Assignee: Telson Electronics Co., Ltd., Seoul, Rep. of Korea

[21] Appl. No.: 08/968,301

[22] Filed: Nov. 12, 1997

[30] Foreign Application Priority Data

May 12, 1997 [KR] Rep. of Korea ................. 97-18350

[51] Int. Cl.[7] ................................................. G08B 5/22
[52] U.S. Cl. ................. 340/825.44; 455/456; 455/458; 340/825.03
[58] Field of Search ................. 340/825.44, 825.47, 340/825.48, 825.57, 825.52, 825.03; 455/226.2, 38.1, 67.1, 67.7, 31.3, 458, 456, 12.1; 381/57, 107; 370/313, 332, 333, 338

[56] References Cited

U.S. PATENT DOCUMENTS

| | | |
|---|---|---|
| 4,910,511 | 3/1990 | Nagata et al. . |
| 5,122,795 | 6/1992 | Cubley et al. . |
| 5,506,886 | 4/1996 | Maine et al. . |
| 5,797,097 | 8/1998 | Roach, Jr. et al. ................. 455/456 |

*Primary Examiner*—Michael Horabik
*Assistant Examiner*—Jean B. Jeanglaude
*Attorney, Agent, or Firm*—Jacobson, Price, Holman & Stern, PLLC

[57] ABSTRACT

A method for controlling a call reception operation in a wide area radio pager, which is capable of providing a continued stable radio call service to the radio pager without generating errors in receiving radio call signals even when the user of the radio pager is positioned in a boundary area between adjacent areas during his area movement. Radio call signals, which are transmitted from a base station, are carried with identification data containing information associated with an area reported to the communication company end as a destination area to which the user of the associated wide area radio pager is to move. Based on such area movement ID data, the radio pager recognizes the destination area to which the user of the radio pager is to move. When an area movement of the radio pager occurs, the receiving channel of the radio pager is changed using only the channel associated with the area represented by area movement ID data received at the radio pager, without using channels associated with all available areas one by one in a predetermined order. Therefore, there is no channel reception nor area recognition error in boundary areas.

9 Claims, 8 Drawing Sheets

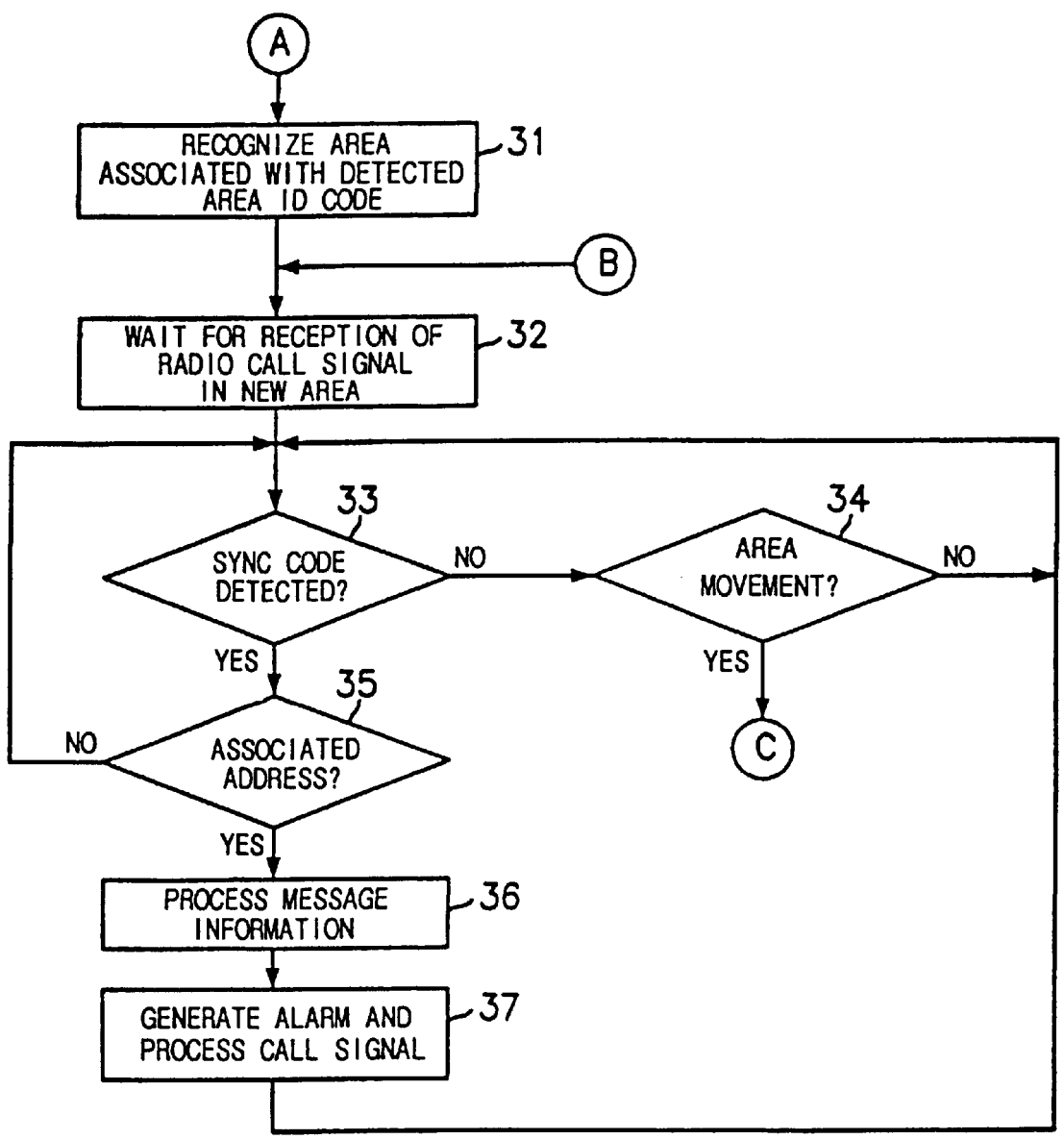

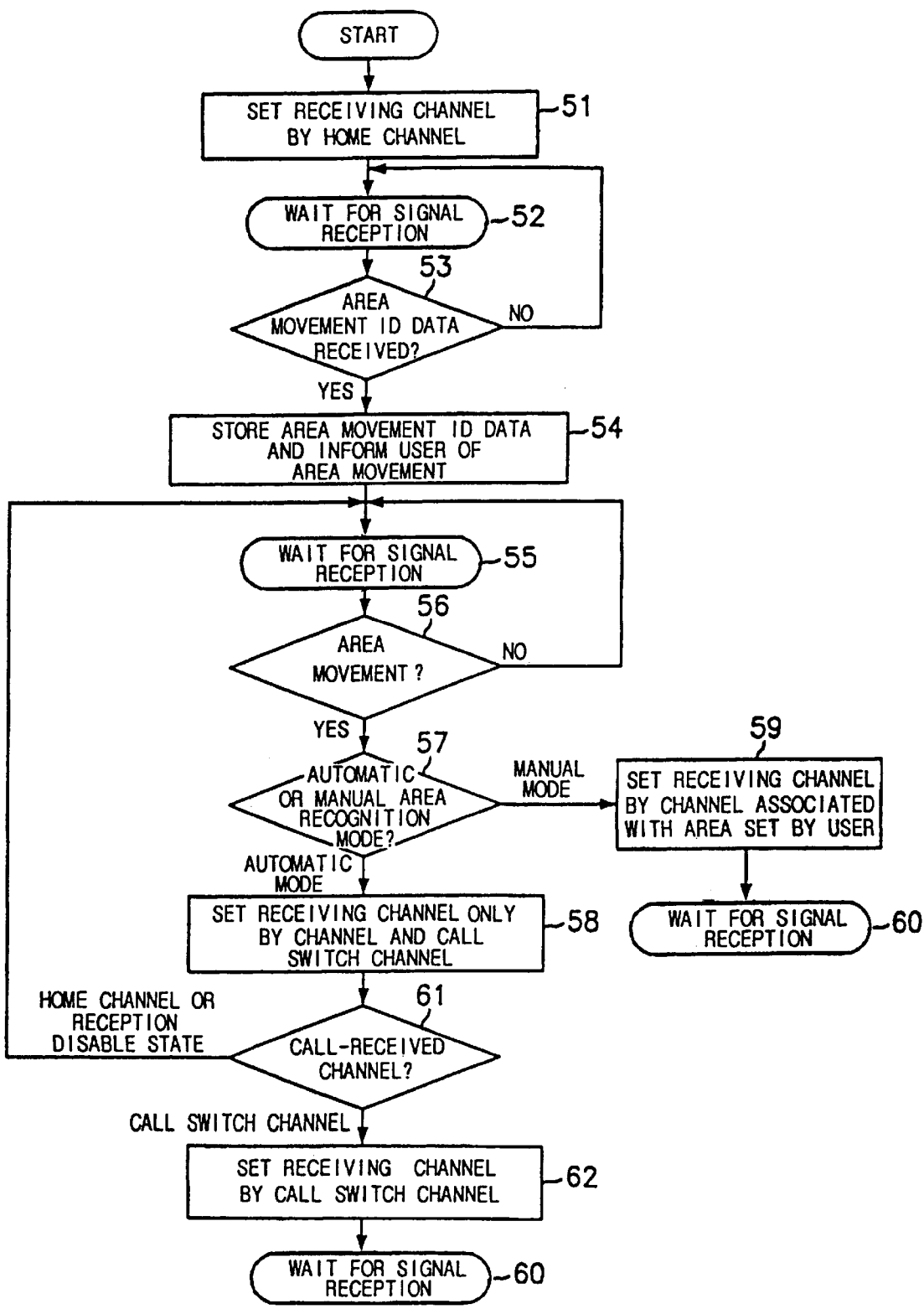

CALL RECEPTION CONTROL METHOD IN WIDE AREA RADIO PAGER CAPABLE

BACKGROUND OF THE INVENTION

1. Field of the Invention

The present invention relates to a method for controlling a call reception operation in a wide area radio pager, and more particularly to such a call reception control method capable of avoiding reception errors in boundary areas.

2. Description of the Prior Art

Generally, a wide area radio pager is a radio pager which is configured so that even when the user moves from a service area originally registered for the pager to an area not registered, the same call service as in the registered area is continuously provided in the unregistered area.

The configuration of such a wide area radio pager, a call reception control method applied to the wide area radio pager, and radio call reception errors of the wide area radio pager occurring in boundary areas will now be described in conjunction with FIGS. 1 to 3.

FIG. 1 is a block diagram illustrating the configuration of a wide area radio pager.

As shown in FIG. 1, the wide area radio pager includes a receiving unit 11 for receiving a radio call signal from a base station via a receiving channel set by a desired local oscillation frequency, and a control unit 12 for automatically recognizing an area, to which the user of the pager moves, in response to the movement of the user or a key manipulation by the user, thereby outputting a control signal for controlling a reception status of the receiving unit 11. The wide area radio pager also includes a PLL synthesizing unit 13 for receiving the control signal from the control unit 12, generating a local oscillation frequency for changing the reception status of the receiving unit 11 based on the received control signal, and sending the local oscillation frequency to the receiving unit 11, and a memory unit 14 stored with channel information and area codes associated with all available areas and adapted to provide, to the control unit 12, the channel information and area code associated with the area to which the user of the pager has moved, when the control unit 12 performs a control function to recognize the area.

The control unit 12 internally includes a decoder 15 and a central processing unit (CPU) 16. When the user of the pager moves to an area, the CPU 16 reads out the channel information and area code associated with the area, to which the user has moved, from the memory unit 14, thereby generating a reception change control signal for changing a reception status of the receiving unit 11 so that the reception status meets the channel associated with the area. When the CPU 16 detects a radio call signal received at the pager under the condition in which the reception status of the receiving unit 11 has changed as mentioned above, it detects an area code carried in the radio call signal and compares the detected area code with the area code read out from the memory unit 14. Where the compared area codes are identical to each other, the CPU 16 recognizes the area represented by the detected area code as the area to which the user has moved, so that it performs a control for receiving a radio call signal in the recognized area.

The decoder 15 is enabled by a control signal generated from the CPU 16 after the CPU 16 recognizes the area to which the user has moved. In the enable state, the decoder 15 decodes the radio call signal received at the receiving unit 11. When the decoder 15 detects an address associated therewith from the decoded signal, it sends message information included in the decoded signal to the CPU 16.

Such a call receiving procedure carried out in the above-mentioned wide area radio pager is illustrated in FIG. 2. Now, the call receiving procedure will be described in detail in conjunction with FIG. 2.

In order for the wide area radio pager to perform a wide area call service, the memory unit 14 is previously stored with channel information and area identification (ID) codes associated with all available areas.

When the radio pager turns on in accordance with an application of power thereto, variables of all functional units of the radio pager including the CPU 16 are initialized (Step 20). Initially, the receiving channel of the radio pager is set by the channel of a service area originally registered for the radio pager. In this state, the radio pager performs an operation for receiving a radio call signal (Step 21).

Where no radio call signal is detected via the initially set receiving channel for a predetermined period of time from a point of time when a radio call signal has been received via the receiving channel, such a non-reception results from a situation in which the radio pager is positioned in a poor reception area, a situation in which there is a failure in the base station associated with the radio pager, or a situation in which the radio pager has moved to an area not registered. When it is determined that the radio pager has moved to an area not registered, in accordance with a desired determination procedure (Step 22), it is determined whether the area recognition mode of the radio pager set by a manipulation switch unit included in the radio pager corresponds to an automatic mode or a manual mode (Step 23).

Where the area recognition mode is in an automatic mode, the CPU 16 reads out channel information associated with the recognized area and area information, namely, area ID codes associated with the channel information, from the memory unit 14 in accordance with a predetermined read-out order and sets the information therein (Step 25). The CPU 16 also controls the PLL synthesizing unit 13 so that the PLL synthesizing unit 13 is tuned to the channel read out from the memory unit 14 (Step 26). Subsequently, the CPU 16 determines whether or not a radio call signal is received via the set channel (Step 27). When the a radio call signal received via the set channel is detected, the CPU 16 extracts area information, namely, an area ID code, from the detected radio call signal. The CPU 16 then determines whether or not the extracted area ID code corresponds to the area ID code read out from the memory unit 14 (Step 28).

When it is determined at step 28 that the area ID codes are different from each other, the procedure returns to Step 25 so as to read out a next channel determined in accordance with the above-mentioned read-out order. When the area ID codes correspond to each other, the CPU 16 determines that the area represented by the extracted area ID code corresponds to the area to which the user has moved (Step 31). In this case, the CPU 16 changes the reception status of the radio pager so that the radio pager receives a radio call service in the newly determined area. Under this condition, the radio pager waits for the reception of a radio call signal in the newly determined area (Step 32).

On the other hand, where it is determined at step 27 that there is no radio call signal received via the set channel, the procedure returns to step 25 so as to read out channel information associated with a next area and area ID codes associated with the channel information. Thereafter, it is repeatedly determined whether or not a radio call signal is received via a newly set channel Where there is no radio call signal until a period of time set to perform the signal reception determination procedure for all channels elapses (Step 29), this signal non-reception does not result from a situation in which the radio pager has moved to an area not registered, but results from a situation in which the radio pager is positioned in a poor reception area or a situation in which there is a failure in the base station associated with the radio pager. In this case, accordingly, the signal reception disable situation is displayed on a display unit included in the radio pager. The receiving channel of the radio pager changed on the basis of the area movement of the radio pager is recovered to the channel set just before the area movement of the radio pager is determined (Step 30). A return procedure is then executed.

Meanwhile, where it is determined at step 23 that the area recognition mode is in a manual mode, the CPU 16 recognizes the area and manually set by the user as the area to which the radio pager has moved (Step 24). The receiving channel of the radio pager is then changed so that it is set by a channel used in the area to which the radio pager has moved. After the channel change, the radio pager waits for the reception of a radio call signal in the newly set area (Step 32).

After newly setting the receiving channel by the channel of the area automatically or manually recognized as a new area, the radio pager waits for the reception of a radio call signal in the newly set area. When a radio call signal is received at the radio pager, CPU 16 determines whether or not the decoder 15 detects a synchronous code included in the received radio call signal (Step 33). Where a synchronous code is detected from the radio call signal, the decoder 15 extracts address information from a frame following the synchronous code and determines whether or not the extracted address corresponds to the address associated with the radio pager (Step 35). When the extracted address corresponds to the address of the radio pager, the radio call signal is associated with the radio pager. In this case, the decoder 15 informs the CPU 16 of the fact that the received radio call signal is associated with the radio pager. The CPU 16 then receives and processes message information included in the radio call signal, thereby generating an alarm by a driving unit included in the radio pager while displaying call information by the display unit. (Steps 36 and 37). For reception of a subsequent call signal, the procedure returns to step 33 at which it is determined whether or not the decoder 15 detects a synchronous code.

On the other hand, when no synchronous code is detected by the decoder 15 for a predetermined period of time, it is determined whether or not an area movement of the radio pager occurs (Step 34). Where there is no area movement of the radio pager, the procedure returns to step 33 to determine whether or not a synchronous code is detected. Where there is an area movement of the radio pager, the procedure returns to step 23 at which the area recognition mode of the radio pager is determined. Also, where it is determined at step 35 that the address extracted after the detection of the synchronous code does not correspond to the address associated with the radio pager, the procedure returns to step 33 to determine whether or not a synchronous code for the reception of a subsequent signal is detected.

Typically, the wide area radio pager having the above-mentioned configuration while using the above-mentioned call reception control method uses a radio call transmission system which transmits a radio call signal having a data format (FIG. 4A) according to the POCSAG protocol.

Recently, a new protocol has been proposed which provides a radio call data format capable of enabling a variety of additional services. This protocol is called a "FLEX protocol". In order to process a radio call signal according to the FLEX protocol, it is necessary to provide an A/D converter 17 between the receiving unit 11 and decoder 15 in the case of FIG. 1. Since FLEX data output from the receiving unit 11 is an analog signal having four or two levels, the A/D converter 17 performs a function for converting the analog signal into 2-bit digital data.

Since the call reception control method used in this case is carried out in accordance with a procedure for processing a variety of additional services, its call reception control procedure for executing a wide area service function is basically identical to that using the POCSAG data format, even though the data format used therein is different from the POCSAG data format.

Meanwhile, when a wide area radio pager having such a configuration is positioned in a boundary area between two adjacent areas in which radio call signals respectively transmitted from the base stations of both the adjacent areas exist in a simultaneous manner, it may receive either of the call signals. In other words, where the radio pager is positioned in a boundary area between two adjacent areas one being an area where the radio pager is currently positioned while the other area being an area adjacent to the current area of the radio pager, in a state in which the radio pager is set by a channel associated with the current area of the radio pager, it may receive a call signal generated in the area adjacent to the current area thereof. In this case, the current position of the radio pager is erroneously determined.

This will be described in detail in conjunction with FIG. 3.

FIG. 3 is a schematic view illustrating a generation of reception errors in boundary areas. In FIG. 3, the reference characters A, B, C and D represent areas in which call services are provided through different channels, respectively. The reference numeral 41 to 45 represent boundary areas among adjacent areas, respectively. In each boundary area, radio call signals respectively transmitted from the base stations of the adjacent areas associated with the boundary area exist in a simultaneous manner.

First, it is assumed that the area A is an area originally registered for a call reception service of the wide area radio pager. Where the user of the radio pager moves from the area A to the area C, he may be temporarily positioned in the boundary area 42 between the areas B and C, the boundary area 44 between the areas C and D or the boundary area 45 among the areas B, C and D.

In accordance with the above-mentioned conventional wide area radio call reception control method, the CPU 16 of the radio pager reads out information about channels respectively associated with all available areas and executes a receiving channel change operation while using those channels one by one. Where the user is positioned in the boundary area 42 between the area B and C, the radio pager can detect a radio call signal under the condition in which the receiving channel thereof is newly set to the channel associated with the area B in accordance with a channel change. In this state, the radio pager also can recognize the area B represented by area information received via the newly set channel as the current position of the user. Thus, the receiving channel of the radio pager is automatically set to the channel associated with the area B. However, radio call signals associated with the radio pager are transmitted via the channel associated with the area C because the user already informed an associated communication company of the fact that the destination to which the user moves is the area C. As a result, the radio pager, which has been automatically set by the channel associated with the area B as mentioned above, can not receive call signals transmitted via the channel associated with the area C. In other boundary areas, such a reception error occurs.

In order to solve such a problem, another method has been proposed. In accordance with this method, when an area movement of the user occurs, the wide area radio pager finds all channels through which call signals are received. Among the found channels, that exhibiting a maximum electric field strength is determined as the channel of the area to which the radio pager moves.

However, this method still have the above-mentioned problem. That is, the channel associated with an area adjacent to a destination area may exhibit an electric field strength higher than that of the channel associated with the destination area in a boundary area between the adjacent areas. In this case, reception errors may be generated. Consequently, it is impossible to completely eliminate reception errors occurring in boundary areas, using this method.

SUMMARY OF THE INVENTION

Therefore, an object of the invention is to solve the above-mentioned problems involved in the prior art and to provide a method for controlling a call reception operation in a wide area radio pager, which is capable of providing a continued stable radio call service to the radio pager without generating errors in receiving radio call signals even when the user of the radio pager is positioned in a boundary area between adjacent areas during his area movement.

In order to accomplish this object, in accordance with the present invention, radio call signals, which are transmitted from a base station, are carried with identification data containing information associated with an area reported to the communication company end as a destination area to which the user of the associated wide area radio pager is to move (namely, area movement ID data). Based on area movement ID data received, the radio pager recognizes the destination area to which the user of the radio pager is to move. When an area movement of the radio pager occurs, the receiving channel of the radio pager is changed using only the channel associated with the area represented by area movement ID data received at the radio pager, without using channels associated with all available areas one by one in a predetermined order.

In accordance with this method, even when the radio pager is positioned in a boundary area, for example, the area 45 of FIG. 3, its receiving channel is changed only using channel information associated with the area C. Accordingly, the radio pager does not receive call signals via channels associated with the areas B and D adjacent to the area C. In other words, there is no case in which the position of the radio pager is erroneously recognized to correspond to the area B or D because area information transmitted via the channel of the area B or D is not detected. Therefore, there is no channel reception nor area recognition error in boundary areas.

In accordance with another method of the present invention, which is capable of accomplishing the above-mentioned object, when the radio pager is positioned in a boundary area during an area movement thereof, the user is informed of this situation by an alarm. In this case, the user is also recommended to manually switch the area recognition mode of the radio pager to a manual mode. Thus, the reception status of the radio pager is fixed only by the channel associated with the area manually set. Accordingly, no call signal received via areas adjacent to the set area is received. Recognition of a boundary area where the radio pager is positioned is carried out by detecting the number of channels receiving call signals while changing the receiving channel of the radio pager to channels associated with all available areas one by one, and determining the radio pager to be positioned in a boundary area when the number of the signal-received channels is at least two.

Reception errors occurring when a wide area radio pager is positioned after an area movement thereof results from the use of the conventional method in which the reception status of the radio pager is changed during the area movement in accordance with information about channels associated with all available areas which are used one by one in accordance with a predetermined order. Since the receiving channel of the radio pager is changed using only the channel associated with the area represented by area movement ID data received from the associated system, without using the channels associated with all available areas, in accordance with the present invention, it is possible to completely avoid reception errors in boundary areas. When it is determined that the radio pager is positioned in a boundary area, the operation mode of the radio pager is changed to a manual mode so that the user can directly set the area where the radio pager is currently positioned. Although this method is carried out in a semiautomated manner, it provides an effect of preventing reception errors from occurring in boundary areas.

BRIEF DESCRIPTION OF THE DRAWINGS

Other objects and aspects of the invention will become apparent from the following description of embodiments with reference to the accompanying drawings in which:

FIG. 5 is a flow chart illustrating a call reception control method according to an embodiment of the present invention.

DESCRIPTION OF THE PREFERRED EMBODIMENTS

Figure 1:
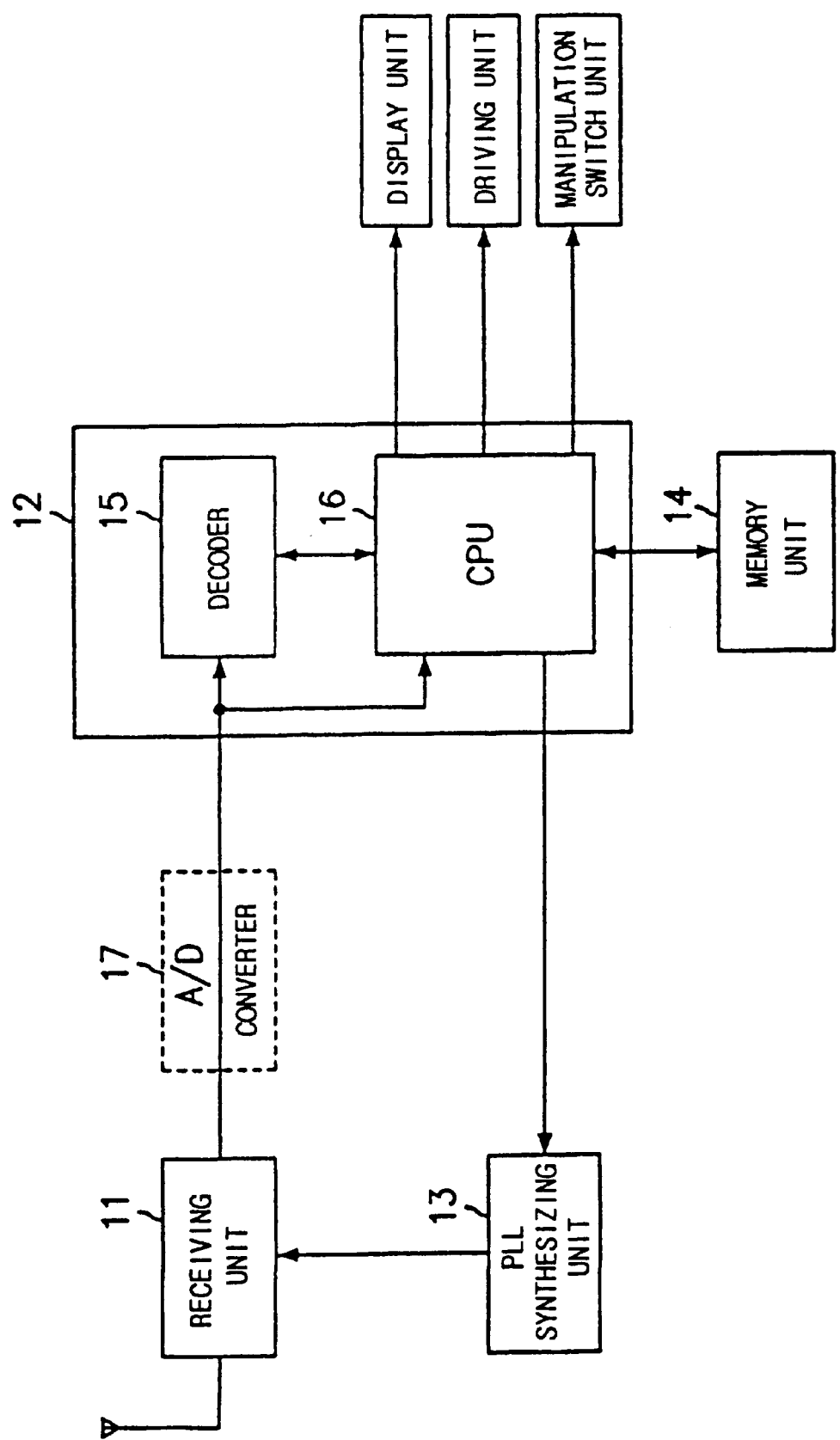
FIG. 1 is a block diagram illustrating the configuration of a wide area radio pager.
Figure 2A:
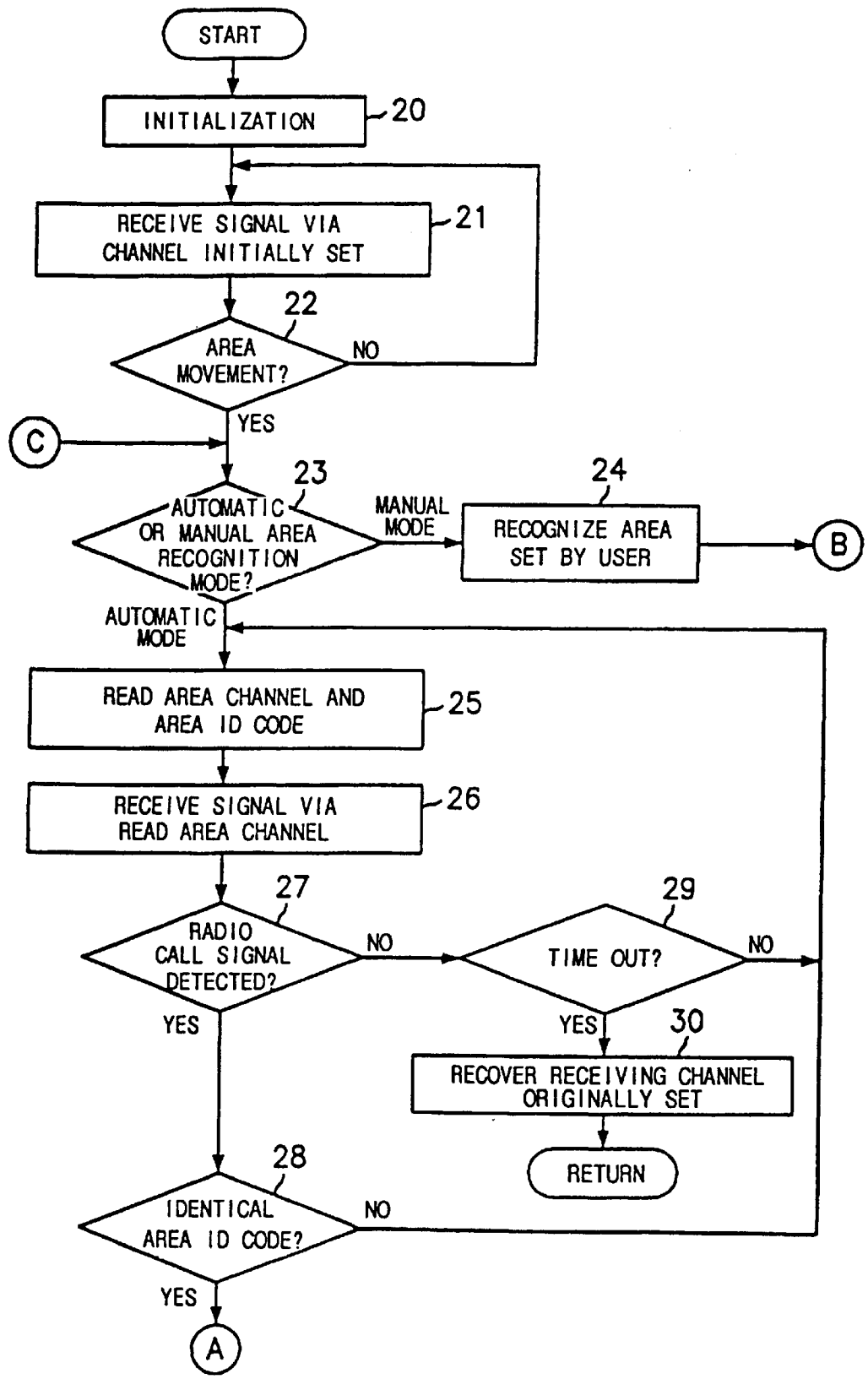
FIG. 2 is a flow chart illustrating a conventional call reception control method applied to the wide area radio pager of FIG. 1.
Figure 3:
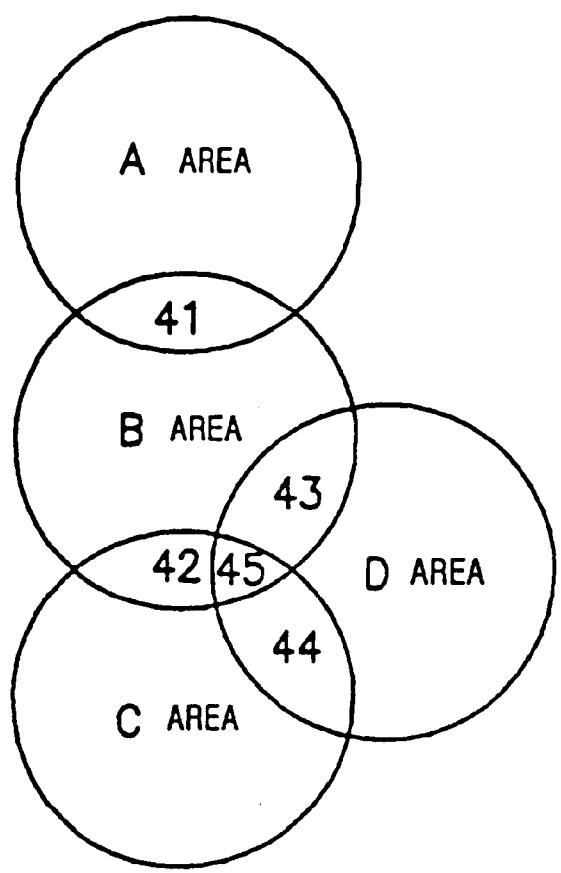
FIG. 3 is a schematic view illustrating a generation of reception errors in boundary areas.
Figure 4A:
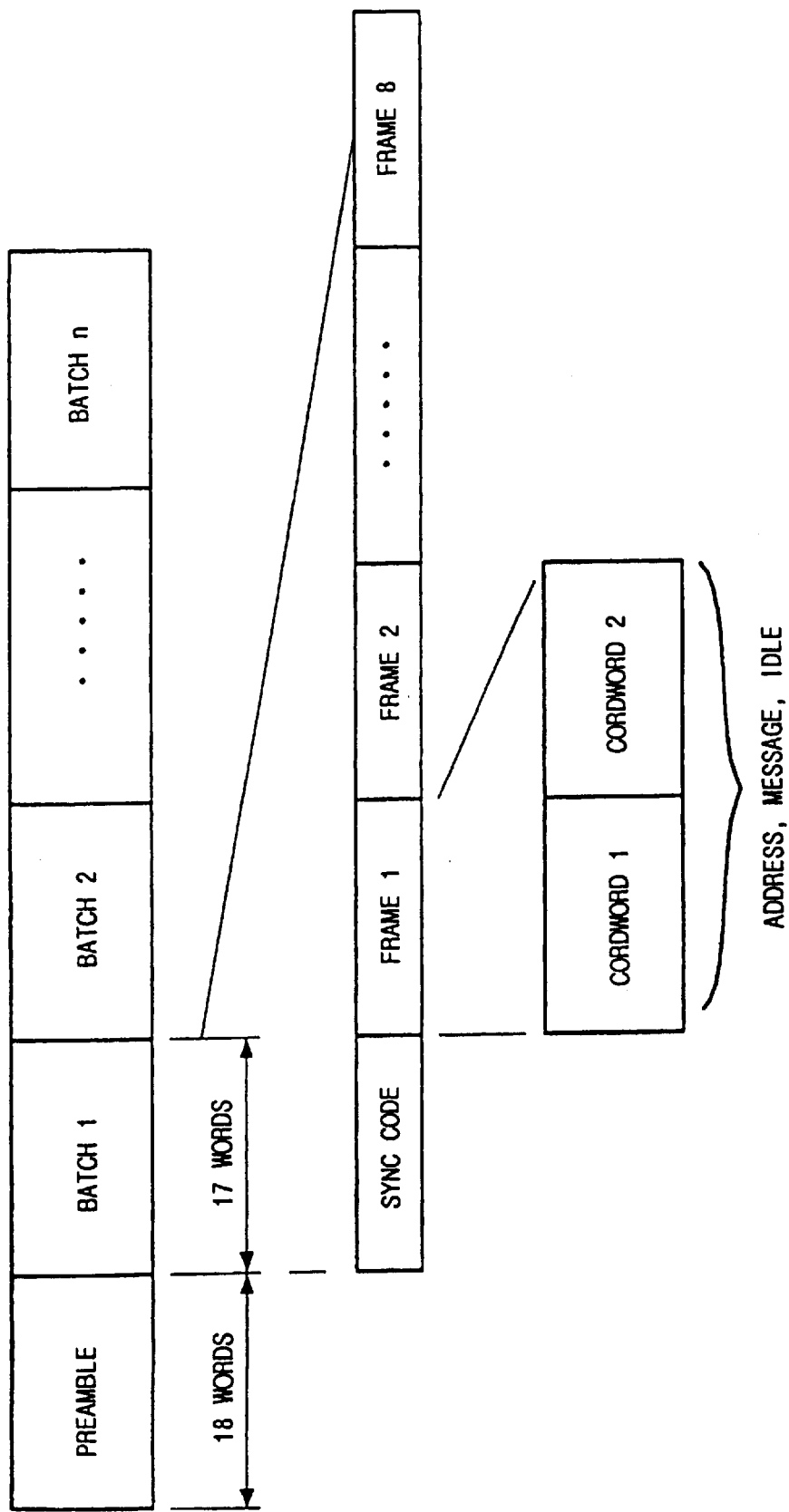
FIG. 4A is a diagram illustrating a data format of a radio call signal according to the POCSAG protocol.
Figure 4B:
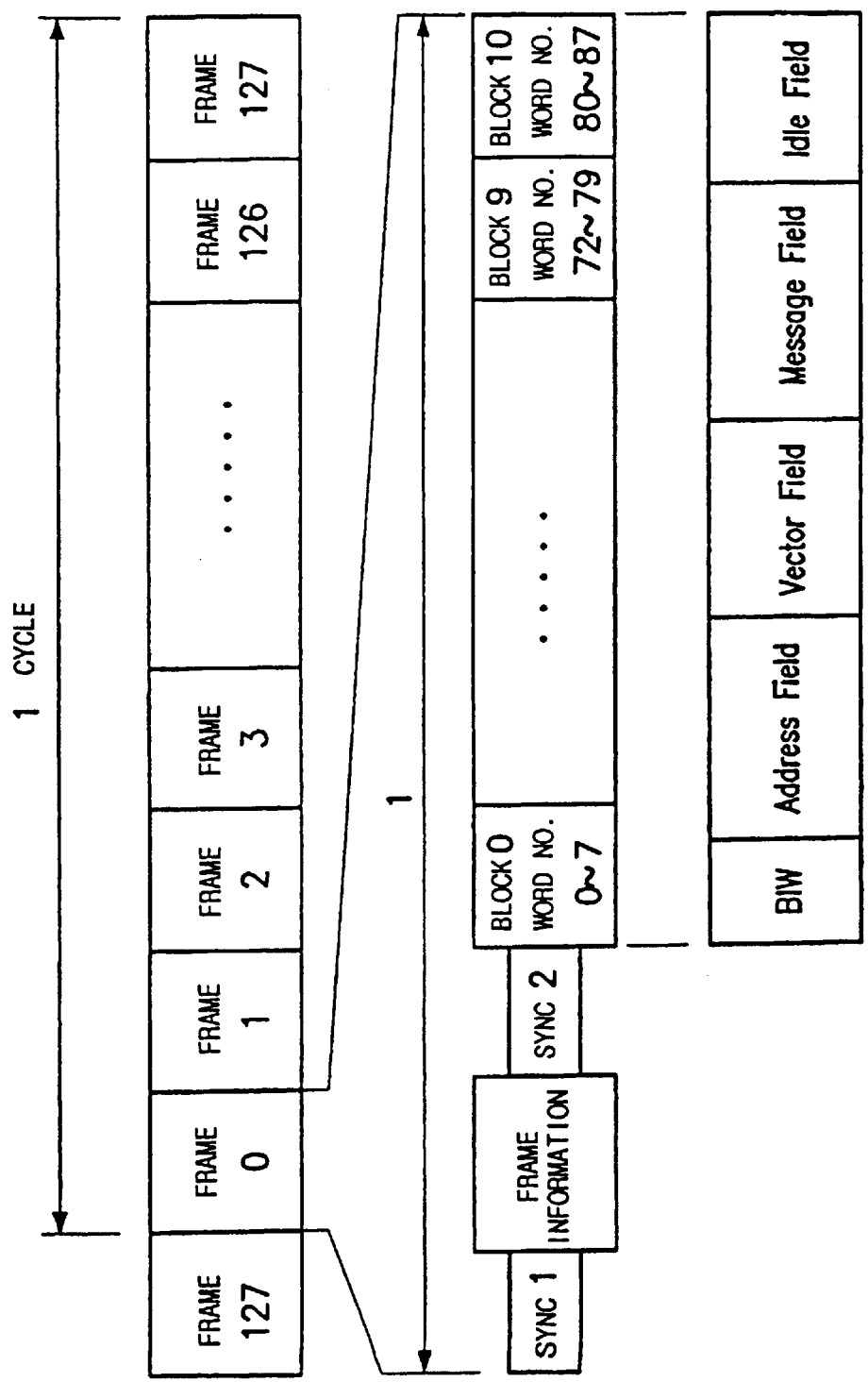
FIG. 4B is a diagram illustrating a data format of a radio call signal according to the FLEX protocol.

FIGS. 4A and 4B are diagrams respectively illustrating data formats of radio call signals according to different signal transmission protocols. FIG. 4A shows a data format of a radio call signal according to the POCSAG protocol whereas FIG. 4B shows a data format of a radio call signal according to the FLEX protocol.

In order to implement the present invention, it is required for radio call signals to contain area movement identification (ID) data. Such area ID data, which is transmitted from the system end, should contain an area ID code associated with an area which is reported to the system end as a destination area to which the user of the associated wide area radio pager is to move. However, radio call signals used in existing POCSAG signal systems do not contain the above-mentioned data. Accordingly, where the present invention is applied to POCSAG signal systems, such data is carried in a message field of the code word of a POCSAG signal. Since such data has the form of a message, it may be displayed on the display unit of the wide area radio pager. In order to prevent such data from being displayed, a particular code is added to the leading end of the data.

Radio call signals according to the FLEX protocol contain data called a "secure message". It is recommended that such data is positioned between the vector field and message field. Accordingly, where the present invention is applied to radio call signals according to the FLEX protocol, such "secure message" data is used as data for the identification of an area movement. The area movement ID data required in the present invention is not limited to the "secure message" data. In other words, the present invention may use any data contained in a radio call signal according to the FLEX protocol, so long as the data carries a code indicative of an area to which the user is to move.

Now, a call reception control method according to the present invention, which is carried out in association with radio call signals according to the above-mentioned protocols, will be described in conjunction with FIG. 5.

FIG. 5 is a flow chart illustrating a call reception control method according to an embodiment of the present invention, which is applied to a wide area radio pager in order to avoid reception errors in boundary areas.

In accordance with this method, when electric power is applied to the wide area radio pager, variables of constituting elements of the radio pager including a CPU are first initialized. The receiving channel of the radio pager is also set by the channel of a service area originally registered for the radio pager, namely, the home channel (Step 51). After the completion of the initialization, the CPU waits for a reception of radio call signals (Step 52). In this state, it is determined whether or not area movement ID data is received (Step 53). Where no area movement ID data is received, the procedure returns to step 52 at which the CPU waits for a reception of radio call signals. When it is determined at step 53 that there is an area movement ID data received, the CPU recognizes the fact that the user of the radio pager is to move to an area corresponding to the received area movement ID data. In this cases the CPU stores the area code carried in the data and displays an occurrence of the area movement on a display unit of the radio pager (Step 54).

After the execution of step 54, the CPU waits again for a reception of call signals under the condition in which the receiving channel is set by the home channel (Step 55). It is also determined whether or not an area movement of the radio pager occurs (Step 56). Where no radio call signal is detected via the set receiving channel for a predetermined period of time, it is determined that such a non-reception results from an area movement of the radio pager or a situation in which the radio pager is positioned in a poor reception area. In this case, it is also determined whether the current non-reception state results from an area movement of the radio pager or a situation in which the radio pager is positioned in a poor reception area, in accordance with a desired determination method.

When it is determined at step 56 that an area movement of the radio pager has occurred, it is determined whether the area recognition mode of the radio pager corresponds to an automatic mode or a manual mode (Step 57). Where the area recognition mode is set in a manual mode, the user manipulates an operation setting key, thereby manually setting the receiving channel by the channel associated with the set area (Step 59). After the execution of step 59, the CPU waits for a reception of call signals via the newly set receiving channel (Step 60).

On the other hand, where the area recognition mode is in an automatic mode, it is determined whether or not a radio call signal is received via the receiving channel, while alternately changing the receiving channel to the home channel and the channel corresponding to the area code contained in the previously stored area movement ID data, namely, the call switch channel (Steps 58 and 61).

When a call signal is received via the home channel, it is determined that no area movement of the radio pager occurs yet. In this case, the procedure returns to step 55 at which the CPU waits for a reception of call signals, under the condition in which the receiving channel is maintained in a state set by the home channel. Where it is determined at step 61 that a non-reception state resulting from a situation in which the radio pager is positioned in a poor reception area occurs, the procedure also returns to step 55 at which the CPU waits for a reception of call signals.

When a call signal is received via the call switch channel, it is determined that the area movement of the radio pager is completed. In this case, the receiving channel is set by the channel associated with the area at which the area movement of the radio pager is completed (Step 61). After the execution of step 61, the CPU displays the destination area on the display unit while intermittently generating an alarm by the driving unit. Thereafter, the CPU waits for a reception of call signals (Step 60).

Figure 6:
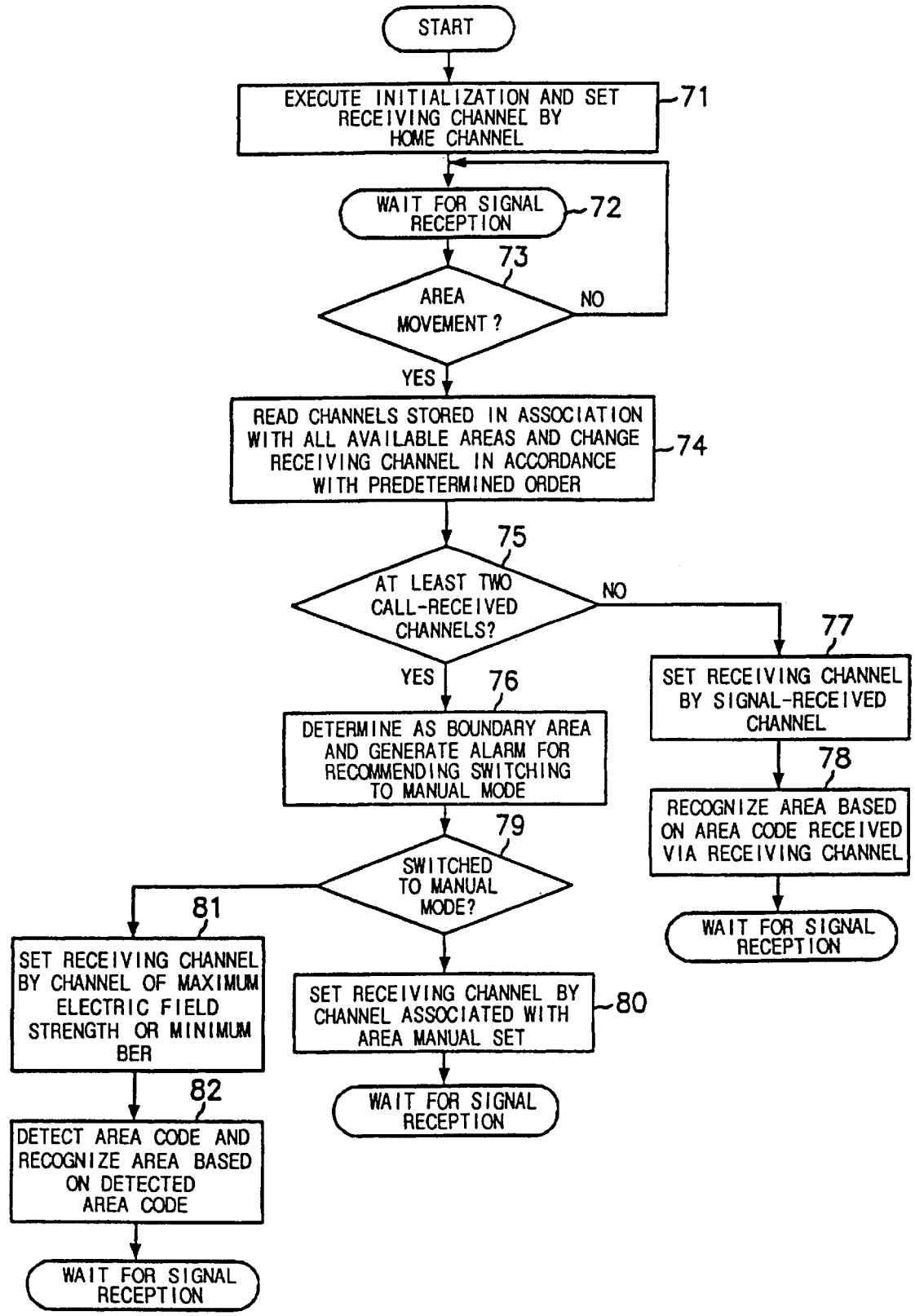
FIG. 6 is a flow chart illustrating a call reception control method according to another embodiment of the present invention.

FIG. 6 is a flow chart illustrating a call reception control method according to another embodiment of the present invention, which is applied to a wide area radio pager in order to avoid reception errors in boundary areas.

In accordance with this method, when electric power is applied to the wide area radio pager, variables of constituting elements of the radio pager including a CPU are first initialized. The receiving channel of the radio pager is also set by the home channel (Step 71). After the completion of the initialization, the CPU waits for a reception of radio call signals (Step 72).

It is then determined whether or not an area movement of the radio pager occurs (Step 73). Where it is determined at step 73 that there is an area movement of the radio pager, the CPU reads out channel information associated with the recognized area and area information, namely, area ID codes associated with the channel information and sets the receiving channel by the read-out channels one by one in accordance with a predetermined order (Step 74).

After the execution of step 74, it is determined whether or not there are at least two channels respectively receiving call signals (Step 75). Where there are at least two channels receiving call signals, it is determined that the radio pager is currently positioned in a boundary area. In this case, the CPU outputs an visible and audible signal for recommending the user to set the operation mode of the radio pager in a manual mode (Step 76).

On the other hand, where there is only one channel receiving a call signal, this channel is set to the receiving channel of the radio pager (Step 77). In this case, the area information received via the set channel is detected, thereby recognizing the area associated with the detected area information. Thereafter, the procedure proceeds to the step of waiting for a reception of call signals (Step 78).

As the user sets the operation mode of the radio pager in a manual mode and sets the area where the radio pager is currently positioned, in response to the signal recommending a mode switching to the manual mode, the channel associated with the set area is set to the receiving channel of the radio pager (Step 80). The procedure then proceeds to the step of waiting for a reception of call signals (Step 78).

When the user does not change the operation mode of the radio pager to the manual mode until a predetermined period of time elapses, the receiving channel is automatically set by the channel exhibiting a maximum electric field strength or a minimum bit error rate (BER), which is selected from the signal-received channels (Step 81). The current area of the radio pager is recognized, based on the area code detected from the call signal received via the set channel (Step 82).

As apparent from the above description, in accordance with the present invention, when the user of the wide area radio pager moves from a service area originally registered to an area not originally registered, only the channel associated with the area represented by area movement ID data received at the radio pager is set to the receiving channel of the radio pager, without setting the receiving channel by channels associated with all available areas one by one in a predetermined order, as in the conventional methods. Accordingly, the present invention prevents an occurrence of reception errors in boundary areas, When it is determined that the radio pager is positioned in a boundary area, the operation mode of the radio pager is changed to a manual mode so that the user can directly set the area where the radio pager is currently positioned, thereby preventing reception errors from occurring in the boundary area.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A call reception control method applied to a wide area radio pager, comprising the steps of:
   (a) setting a receiving channel of the radio pager by a home channel, which is a channel associated with an area originally registered as a service area for the radio pager, and then waiting for a reception of radio call signals;
   (b) determining whether or not area movement identification data is received from a system associated with the radio pager, and if it is determined that area movement identification data from the system is received, then recognizing a situation, in which an area movement of the radio pager is to occur, while storing an area code carried in the received area movement identification data;
   (c) determining whether or not an area movement of the radio pager occurs;
   (d) if it is determined that an area movement of the radio pager occurs, then alternately changing the receiving channel of the radio pager to the home channel and a call switch channel, which is a channel associated with an area represented by the stored area code, until a call signal is received; and
   (e) if a call signal is received via the call switch channel, then determining the area movement of the radio pager to be completed and setting the receiving channel of the radio pager by a channel associated with the area at which the area movement of the radio pager is completed.

2. The call reception control method in accordance with claim 1, further comprising the step of:
   when an area recognition mode of the radio pager is in a manual mode, manually setting the receiving channel of the radio pager by a channel associated with an area set by a key manipulation of a user, after the execution of step (c).

3. The call reception control method in accordance with claim 2, further comprising the step of:
   if a call signal is received via the home channel after the execution of step (d), then determining the area movement of the radio pager not to be completed and maintaining the receiving channel of the radio pager in a state set by the home channel.

4. The call reception control method in accordance with claim 1, wherein the area movement identification data received at step (b) contains at least an identification code associated with an area reported as a destination area at which the area movement of the radio pager is completed.

5. The call reception control method in accordance with claim 4, wherein the reception of the area movement identification data executed at step (b) comprises the step of detecting data carried in a message field of a codeword contained in a call signal transmitted from the system in the case in which the call signal has a data format according to the POCSAG data protocol.

6. The call reception control method in accordance with claim 4, wherein the reception of the area movement identification data executed at step (b) comprises the step of detecting data carried between vector and message fields of a call signal transmitted from the system in the case in which the call signal has a data format according to the FLEX data protocol.

7. A call reception control method applied to a wide area radio pager, comprising the steps of:
   (a) setting a receiving channel of the radio pager by a home channel, which is a channel associated with an area originally registered as a service area for the radio pager, and then waiting for a reception of radio call signals;
   (b) determining whether or not an area movement of the radio pager occurs, and if it is determined that an area movement of the radio pager occurs, then reading out channel and area information previously stored and associated with all available areas and determining whether or not there is a channel receiving a call signal, while setting a receiving channel of the radio pager by channels based on the read-out channel information one by one in accordance with a predetermined order;
   (c) if it is determined on the basis of the determination at step (b) that there are at least two channels receiving call signals, then determining an area, at which the radio pager is currently positioned, as a boundary area, and outputting a signal for recommending an area recognition mode of the radio pager to be set in a manual mode;
   (d) if a user of the radio pager switches the area recognition mode of the radio pager to a manual mode and then sets the current area of the radio pager, then setting the receiving channel of the radio pager by a channel associated with the manually set area; and
   (e) if it is determined on the basis of the determination at step (b) that there is only one channel receiving a call signal, then determining the signal-received channel as the receiving channel of the radio pager, detecting area information carried via the determined channel, thereby recognizing an area corresponding to the determined channel, and setting the receiving channel of the radio pager by a channel associated with the recognized area.

8. The call reception control method in accordance with claim 7, further comprising the step of:

if the user does not change the area recognition mode of the radio pager to the manual mode until a predetermined period of time elapses from a point of time when the recommend signal is generated, setting the receiving channel of the radio pager by a channel exhibiting a maximum electric field strength, which is selected from the signal-received channels, recognizing an area, which is represented by an area code detected from the call signal received via the set channel, as the current area of the radio pager, and setting a channel associated with the recognized area to the receiving channel of the radio pager.

9. The call reception control method in accordance with claim 7, further comprising the step of:

if the user does not change the area recognition mode of the radio pager to the manual mode until a predetermined period of time elapses from a point of time when the recommend signal is generated, setting the receiving channel of the radio pager by a channel exhibiting a minimum bit error rate, which is selected from the signal-received channels, recognizing an area, which is represented by an area code detected from the call signal received via the set channel, as the current area of the radio pager, and setting a channel associated with the recognized area to the receiving channel of the radio pager.

* * * * *